US012310380B2

(12) United States Patent
Kapuganti et al.

(10) Patent No.: US 12,310,380 B2
(45) Date of Patent: May 27, 2025

(54) METHOD FOR EXTENDING SHELF-LIFE OF AGRICULTURAL PRODUCE

(71) Applicant: National Institute of Plant Genome Research, New Delhi (IN)

(72) Inventors: Jagadis Gupta Kapuganti, New Delhi (IN); Mallesham Bulle, New Delhi (IN); Aprajita Kumari, New Delhi (IN)

(73) Assignee: NATIONAL INSTITUTE OF PLANT GENOME RESEARCH, New Dehli (IN)

( * ) Notice: Subject to any disclaimer, the term of this patent is extended or adjusted under 35 U.S.C. 154(b) by 579 days.

(21) Appl. No.: 17/282,862

(22) PCT Filed: Mar. 9, 2020

(86) PCT No.: PCT/IN2020/050219
§ 371 (c)(1),
(2) Date: Apr. 5, 2021

(87) PCT Pub. No.: WO2020/183491
PCT Pub. Date: Sep. 17, 2020

(65) Prior Publication Data
US 2021/0345629 A1    Nov. 11, 2021

(30) Foreign Application Priority Data
Mar. 11, 2019  (IN) .............. 201911009428

(51) Int. Cl.
*A23B 7/00*    (2006.01)
*A01N 3/00*    (2006.01)
(Continued)

(52) U.S. Cl.
CPC .............. *A23B 7/152* (2013.01); *A23B 7/157* (2013.01)

(58) Field of Classification Search
CPC ............ A23B 7/152; A23B 7/157; A01N 3/00
See application file for complete search history.

(56) References Cited

U.S. PATENT DOCUMENTS 3,969,089 A  *  7/1976  Moss ............... C10G 25/09
                                          48/212
4,216,238 A  *  8/1980  Baker .............. A23L 3/3526
                                          426/321
(Continued)

FOREIGN PATENT DOCUMENTS

CN     107912526 A     4/2018
WO     1999015022 A1   4/1999

OTHER PUBLICATIONS

Guo et al. "Effects of nitric oxide treatment on the cell wall softening related enzymes and several hormones of papaya fruit during storage." Food Science and Technology International. Jun. 2014. 20(4):309-317. (Year: 2014).*

(Continued)

*Primary Examiner* — Ericson M Lachica
(74) *Attorney, Agent, or Firm* — Panitch Schwarze Belisario & Nadel LLP

(57) ABSTRACT

A method for delaying ripening in an agricultural produce is provided. The method includes the steps of (a) contacting a plant material with a nitrite source; (b) providing at least one hypoxia-inducing source to the plant material to enable the production of nitric oxide in presence of the nitrite source; and (c) exposing an agricultural produce to nitric oxide produced in step (b) for delaying ripening in the agricultural produce. The method is beneficial for increasing the shelf-life of an agricultural produce.

6 Claims, 11 Drawing Sheets
(11 of 11 Drawing Sheet(s) Filed in Color)

(51) Int. Cl.
*A23B 7/152* (2006.01)
*A23B 7/157* (2006.01)

(56) References Cited

U.S. PATENT DOCUMENTS

| | | | |
|---|---|---|---|
| 4,851,035 A | 7/1989 | Pirrung et al. | |
| 4,957,757 A | 9/1990 | Law et al. | |
| 5,458,916 A * | 10/1995 | Kratel | C09C 3/043 427/372.2 |
| 6,271,009 B1 * | 8/2001 | Keinan | C12N 9/0002 435/410 |
| 6,720,017 B1 | 4/2004 | Wills et al. | |
| 2002/0127305 A1 * | 9/2002 | Clarke | A23L 3/3445 426/106 |
| 2002/0133886 A1 * | 9/2002 | Severns | B01J 20/28033 8/142 |
| 2003/0150334 A1 * | 8/2003 | Gbler | A23B 7/152 99/325 |
| 2004/0131736 A1 * | 7/2004 | Pan | A23B 7/148 426/419 |
| 2005/0118310 A1 * | 6/2005 | Lacroix | A23L 3/3472 426/240 |
| 2008/0166694 A1 * | 7/2008 | Weber | B65D 81/2069 435/1.1 |
| 2008/0236038 A1 * | 10/2008 | Pierce | C12N 11/12 47/1.01 R |
| 2008/0318778 A1 | 12/2008 | Riquelme Escobar et al. | |
| 2009/0143231 A1 * | 6/2009 | Payne | A23B 7/154 504/315 |
| 2010/0051450 A1 * | 3/2010 | Murahara | F24S 20/20 204/240 |
| 2010/0129474 A1 * | 5/2010 | Benjamin | A01N 59/00 206/219 |
| 2010/0273155 A1 * | 10/2010 | de Boer | C12Q 1/6895 435/6.12 |
| 2011/0265199 A1 * | 10/2011 | Zhou | C12N 15/8271 800/278 |
| 2012/0087889 A1 * | 4/2012 | Bleeker | A01N 49/00 585/24 |
| 2013/0035232 A1 * | 2/2013 | Pierce | A01H 3/00 504/117 |
| 2013/0330244 A1 * | 12/2013 | Balaban | A61P 15/00 422/236 |
| 2016/0002483 A1 * | 1/2016 | Zhao | A23L 3/3463 106/18.32 |
| 2017/0000142 A1 * | 1/2017 | Clarke | B65B 25/041 435/6.12 |
| 2017/0223968 A1 * | 8/2017 | Siepe | A01N 63/25 |
| 2018/0139975 A1 * | 5/2018 | Malefyt | A23B 7/152 |
| 2018/0213800 A1 * | 8/2018 | Djonovic | A01N 63/36 |
| 2018/0325106 A1 * | 11/2018 | Singh | A01N 3/00 |
| 2019/0159450 A1 * | 5/2019 | Ko | A01N 43/40 |
| 2019/0359547 A1 * | 11/2019 | Singh | C07C 33/36 |
| 2020/0315219 A1 * | 10/2020 | Ostermeier | A23F 3/12 |
| 2021/0076713 A1 * | 3/2021 | Farmer | A23B 5/16 |

OTHER PUBLICATIONS

Yang et al. "Inhibition of nitric oxide synthesis delayed mature green tomato fruits ripening induced by inhibition of ethylene." Scientia Horticulturae. Aug. 25, 2016. 69(14)3401-3411. (Year: 2016).*

Astier et al. "Nitric oxide production in plants." Journal of Experimental Botany. Jun. 22, 2018. 69(14):3401-3411. (Year: 2018).*

"How is Produce Classified Under the Produce Safety Rule?" Jun. 26, 2018. <https://ncfreshproducesafety.ces.ncsu.edu/how-is-produce-classified-under-the-produce-safety-rule/>. Accessed Feb. 14, 2024. (Year: 2018).*

Zhang et al. "Metabolism of endogenous nitric oxide during growth and development of apple fruit." 2011. Scientia Horticulturae. vol. 127, Issue 4. pp. 500-506. (Year: 2011).*

Leshem et al. "Evidence for the function of the free radical gas nitric oxide as an endogenous maturation and senescence regulating factor in higher plants." Nov. 1998. Plant Physiology and Biochemistry. vol. 36. Issue 11. pp. 825-833. (Year: 1998).*

Leshem et al. "Harnessing Senescence Delaying Gases Nitric Oxide and Nitrous Oxide: A Novel Approach to Postharvest Control of Fresh Horticultural Produce." Jan. 1998. Biologia Plantarum. vol. 41. pp. 1-10. (Year: 1998).*

Hamilton et al., "Identification of a tomato gene for the ethylene-forming enzyme by expression in yeast," Proceedings of the National Academy of Sciences, vol. 88, No. 16, pp. 7434-7437 (1991).

International Search Report issued Jun. 3, 2020 in International Application No. PCT/IN2020/050219.

Rudell et al., "Nitric Oxide and Nitrite Treatments Reduce Ethylene Evolution from Apple Fruit Disks," Hortscience, vol. 41, No. 6, pp. 1462-1465 (2006).

Vanin et al., "Endogenous Superoxide Production and the Nitrite/Nitrate Ratio Control the Concentration of Bioavailable Free Nitric Oxide in Leaves," The Journal of Biological Chemistry, vol. 279, No. 23, pp. 24100-24107 (2004).

* cited by examiner

A

Fig 6: oxygen quenching bag in vial to generate hypoxia to induce NO production from leaves

B

METHOD FOR EXTENDING SHELF-LIFE OF AGRICULTURAL PRODUCE

CROSS-REFERENCE TO RELATED APPLICATIONS

This application is a Section 371 of International Application No. PCT/IN2020/050219, filed Mar. 9, 2020, which was published in the English language on Sep. 17, 2020, under International Publication No. WO 2020/183491 A1, which claims priority under 35 U.S.C. § 119(b) to Indian Application No. 201911009428, filed Mar. 11, 2019, the disclosures of each of which are incorporated herein by reference in their entireties.

TECHNICAL FIELD

The subject matter described herein in general relates to the field of plant molecular biology, and particularly to a method for controlling the ripening of agricultural produce.

BACKGROUND OF INVENTION

Fruit ripening is a complex developmental phenomenon involving genetically programmed biochemical as well as physiological processes culminating in changes in the fruit's texture and sensorial attributes. One of the major problems facing the fruit and vegetable industry is the loss of a considerable amount of goods due to spoilage. It is estimated that 12 to 20 percent of the fruit and vegetable products become spoiled from the time they leave the farm until they get to the retail or processing outlets. The spoiling or senescence observed in fruits and vegetables results in a number of undesirable problems. Chief among these problems is the short harvesting season for the goods and the short shelf life of the goods following the harvest. Furthermore, these spoilage losses ultimately result in a higher cost of the goods to the consumer.

A primary cause of the spoilage of fruits and vegetables is their natural ripening process. As the fruit or vegetable becomes ripened, it becomes softer and more easily bruised and susceptible to disease or spoilage. Ethylene, a gaseous plant hormone, is the key signal compound involved directly in the regulation of the ripening process in fruits at all its stages. Ethylene, both internal and external to the fruit, acts with environmental cues, to coordinate the modulation of biochemical events in mature fruits culminating in ripening. Ethylene-signaling in fruits is a tightly coordinated activity under the influence of several signals and phytohormones.

U.S. Pat. No. 4,957,757 describes a method of extending the shelf life of fruits by contacting the fruits with naturally occurring monoamines, naturally occurring polyamines, precursors, metabolites or analogs thereof.

U.S. Pat. No. 4,851,035 describes an ethylene-production-inhibiting compound comprising 2-cycloalkyl-1-aminocyclopropanecarboxylic acids or a derivative thereof. The compound was used in conjunction with the inhibition of ripening and improved storage of fruits, vegetables, and cut flowers.

WO1999015022 describes a method for reducing the rate of deterioration of perishable horticultural produce by fumigating said produce, postharvest with nitric oxide.

The application of nitric oxide (NO) on fruits and vegetables through an external (exogenous source) is associated with numerous drawbacks, for instance: (a) NO is a highly reactive molecule, therefore the use of NO donor can result in the release of sudden NO at high peak, which reacts with biological components and inhibits essential activities of various enzymes which are involved in metabolism; (b) The application of NO from chemical donor results in rapid release of NO, which is only able to block the ethylene pathway to a certain extent. Therefore, the methodology is unable to achieve extended longevity; (c) Application of chemical NO at high concentration can damage the fruit/vegetable defense system via a process called Tyrosine nitration; (d) Application of frequently used chemical NO donor 'sodium nitroprusside (SNP)' produces various gaseous compounds in addition to NO (specifically HCN) releasing cyanide which is highly toxic for consumption; (e) The good NO donors (such as GSNO) are expensive; and (f) Use of high concentration of NO can result in health complications to the operator personnel due to its ability to inhibit mitochondrial complex IV. Recently, molecular genetic approaches leading to transgenic plants with impaired biosynthesis of ethylene have also been reported. Hamilton et al., (Hamilton, A. J., M. Bouzayen, and D. Grierson. "Identification of a tomato gene for the ethylene-forming enzyme by expression in yeast." *Proceedings of the National Academy of Sciences* 88.16 (1991): 7434-7437) identified a cDNA clone for tomato EFE (pTOM13) by inhibiting ethylene synthesis with an antisense gene expressed in transgenic plants.

Although technologies that specifically address postharvest storage life have been in existence for decades, such technologies are hampered by problems such as high cost, side effects, and/or an inability to completely shut off ethylene production. For instance, the chemical treatments involving postharvest fumigation of fruits and vegetables with NO have side effects caused by the NO-releasing compounds. Therefore, there is a need in the art for a safe, economical and non-chemical method of controlling fruit ripening and senescence in plants that can easily and efficiently be utilized across a wide variety of plant species.

SUMMARY OF THE INVENTION

In an aspect of the present disclosure, there is provided a method for delaying ripening in an agricultural produce, said method comprises: (a) contacting a plant material with a nitrite source; (b) providing at least one hypoxia-inducing source to the plant material to enable the production of nitric oxide in presence of the nitrite source; and (c) exposing an agricultural produce to nitric oxide produced in step (b) for delaying ripening in the agricultural produce.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. The same numbers are used throughout the drawings to reference like features and components.

The patent or application file contains at least one drawing executed in color. Copies of this patent or patent application publication with color drawings will be provided by the Office upon request and payment of the necessary fee.

FIG. 1A indicates a setup comprising a small plastic box containing a nitrite solution and a fresh leaf. The box has an inlet and outlet to impose a small pulse (5 min) of hypoxia. The box is connected to a polyacrylic box containing tomatoes. In FIG. 1B, the Left image shows the treatment of tomatoes by hypoxia-induced NO from leaves, and the right image shows control tomatoes treated with ambient air, in accordance with an embodiment of the present disclosure. After $4^{th}$ day, the hypoxic gas was replaced with air by flushing with air to see whether the delay of ripening can be reversed. Surprisingly, the replacement of nitrogen with air reverses the ripening process (FIG. 1B)

DETAILED DESCRIPTION OF THE INVENTION

Figure 1:
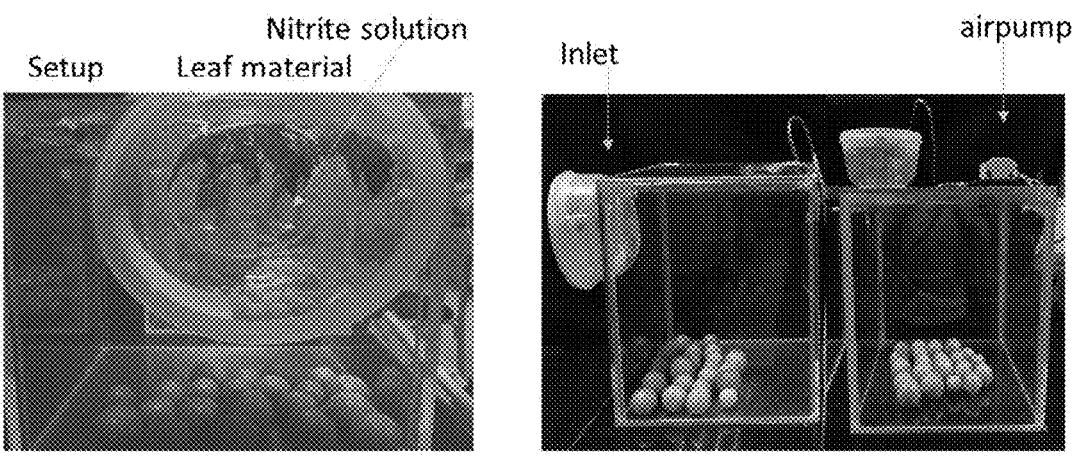
FIG. 1 illustrates the setup to enhance NO from leaves to delay fruit ripening.
Figure 1:
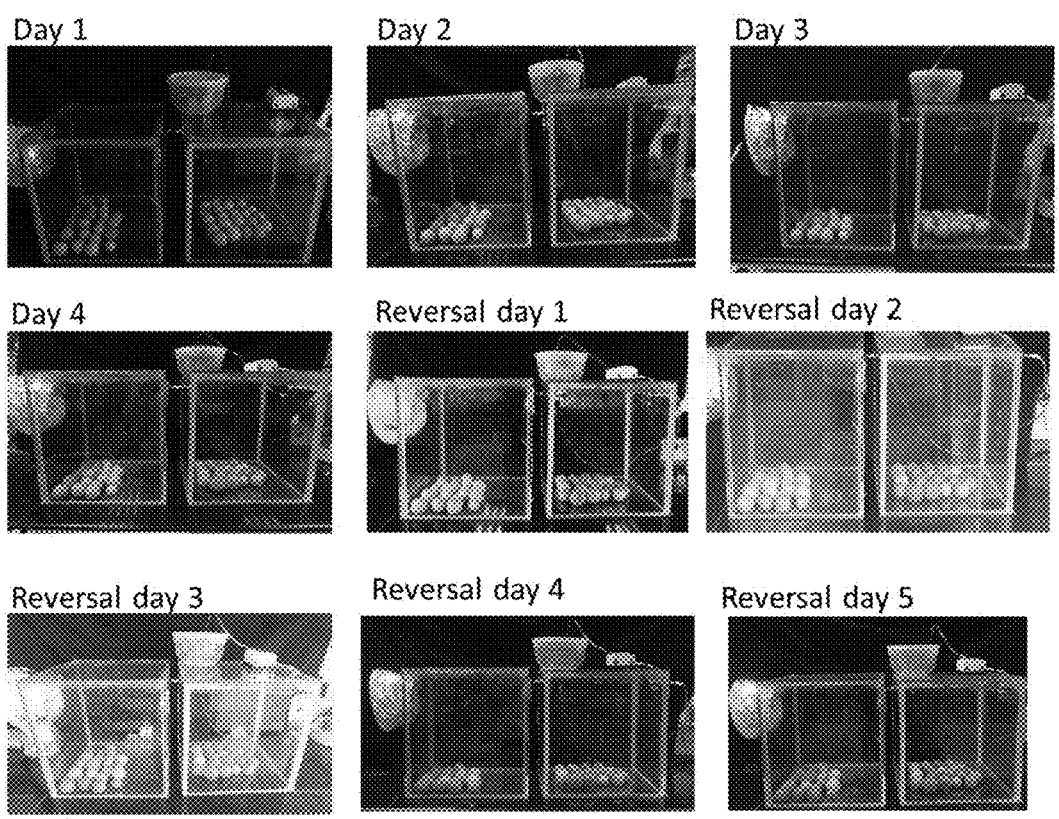

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a ratio range of reduced iron and sodium chloride of 5:1 to 12:1, does not mean to be restrictive to a range of only 5:1 to 12:1, but it also intends to cover any range falling within the previously mentioned range. The range 5:1 to 12:1 also intends to cover a range of 8:1 to 11:1, or 8.25:1 to 11.10:1, or 9:1 to 10.50:1. Also, it intends to include any ratio value falling in between the range, such as 9.25:1, 10:1, 10.5:1, and so on.

The term "at least one" is used to mean one or more and thus includes individual components as well as mixtures/combinations.

For the purposes of the present disclosure, the term "agricultural produce" intends to cover any edible product that is derived through agricultural practice. For example, fruits and vegetables, climacteric fruits, edible stems, and the like. The term "climacteric fruits" are those fruits which are associated with increased ethylene production. The climacteric fruits are also associated with high cellular respiration. The storage of climacteric fruits is problematic owing to the early ripening of the fruits. The term "plant material" refers to any part of a plant that can be used for the purpose of the present disclosure. Leaves as a plant material have been exemplified in the present disclosure. The term "nitrite source" refers to any chemical that is nitrite-based. It is intended to cover all salts of nitrite, for example, potassium nitrite, sodium nitrite and so on. The term "hypoxia-inducing source" depicts any source which can be used to induce hypoxia, for example, nitrogen, or germinating seeds, or oxygen quencher formulation. The term "delaying ripening" is used to denote a time delay in the ripening of the agricultural produce that is achieved because of the method as described in the present disclosure. The time delay depends on the agricultural produce in question. It may vary from one type of agricultural produce to another.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

In order to overcome the problem of using chemical-based nitric oxide (Bproduction for delaying the ripening, the present disclosure provides a means to use non-chemical NO for extending the shelf-life of fruits and vegetables. Specifically, the invention utilizes hypoxia-induced NO from at least one plant material (fresh leaves) as a potential tool to delay the programmed senescence and to increase postharvest longevity of fruits and vegetables.

The present disclosure relies on the induction of NO from fresh leaves and utilizing the NO for delaying the ripening of harvested fruits and vegetables. The hypoxic conditions in the present disclosure are generated by using oxygen quencher (such as reduced Iron+sodium chloride (NaCl)), nitrogen gas or by germinating (high oxygen consuming) seeds in a vial together with leaves. The hypoxic conditions initiate the endogenous production of NO in the leaves, which is tapped and an agricultural produce for which the delay in ripening is required is exposed to the endogenously produced NO, thereby eliminating the requirement of chemical NO through an external source. This non-chemical approach to delay the ripening of an agricultural produce (such as climacteric fruits) is completely different from the methodology which is available in the art. Also, as will be discussed in detail below, the process of the present disclosure is a lot simpler and cost-effective as compared to the approaches involving molecular genetics.

In an embodiment of the present disclosure, there is provided a method for delaying ripening in an agricultural produce, said method comprises: (a) contacting a plant material with a nitrite source; (b) providing at least one hypoxia-inducing source to the plant material to enable the production of nitric oxide in presence of the nitrite source; and (c) exposing an agricultural produce to nitric oxide produced in step (b) for delaying ripening in the agricultural produce.

In an embodiment of the present disclosure, there is provided a method for delaying ripening in an agricultural produce, said method comprises: (a) contacting a plant material with a nitrite source; (b) providing at least one hypoxia-inducing source to the plant material to enable the production of nitric oxide in presence of the nitrite source; and (c) exposing an agricultural produce to nitric oxide produced in step (b) for delaying ripening in the agricultural produce, wherein the agricultural produce is selected from a group consisting of fruit, vegetable, and combinations thereof. In another embodiment of the present disclosure, the agricultural produce is selected from a group consisting of climacteric fruits. In a yet another embodiment, the climacteric fruits is at least one selected from a group consisting of tomato, apple, sugar apple, banana, mango, melon, apricot, papaya, guava, custard apple, passion fruit, avocado, blueberry, sapota, kiwi, fig, plum, broccoli, and pear.

In an embodiment of the present disclosure, there is provided a method for delaying ripening in an agricultural produce as described herein, wherein the plant material is selected from a group consisting of leaves of *Murraya koenigii* plant, leaves of *Anethum graveolens* plant, *Lactuca sativa*, leaves of *Solanum lycopersicum* plant, and combinations thereof. In another embodiment, the plant material is leaves of *Solanum lycopersicum* plant.

In an embodiment of the present disclosure, there is provided a method for delaying ripening in an agricultural produce as described herein, wherein the agricultural produce is selected from a group consisting of fruit, vegetable, and combinations thereof, and wherein the plant material is selected from a group consisting of leaves of *Murraya koenigii* plant, leaves of *Anethum graveolens* plant, *Lactuca sativa*, leaves of *Solanum lycopersicum* plant, and combinations thereof.

In an embodiment of the present disclosure, there is provided a method for delaying ripening in an agricultural produce as described herein, wherein the at least one hypoxia-inducing source is selected from the group consisting of nitrogen gas, a solution comprising reduced iron and sodium chloride, germinating chickpea seeds, germinating pigeon pea seeds, germinating wheat, germinating mung bean seeds, and combinations thereof. In another embodiment, the at least one hypoxia-inducing source is nitrogen gas. In yet another embodiment, the at least one hypoxia-inducing source is a solution comprising reduced iron and sodium chloride. In an alternate embodiment, the at least one hypoxia-inducing source is germinating mung bean seeds.

In an embodiment of the present disclosure, there is provided a method for delaying ripening in an agricultural produce as described herein, wherein the at least one hypoxia-inducing source is selected from the group consisting of nitrogen gas, a solution comprising reduced iron and sodium chloride, germinating chickpea seeds, germinating pigeon pea seeds, germinating wheat, germinating mung bean seeds, and combinations thereof, and wherein the plant material is selected from a group consisting of leaves of *Murraya koenigii* plant, leaves of *Anethum graveolens* plant, *Lactuca sativa*, leaves of *Solanum lycopersicum* plant, and combinations thereof.

In an embodiment of the present disclosure, there is provided a method for delaying ripening in an agricultural produce as described herein, wherein the at least one hypoxia-inducing source is selected from the group consisting of nitrogen gas, a solution comprising reduced iron and sodium chloride, germinating chickpea seeds, germinating pigeon pea seeds, germinating wheat, germinating mung bean seeds, and combinations thereof, and wherein the plant material is selected from a group consisting of leaves of *Murraya koenigii* plant, leaves of *Anethum graveolens* plant, *Lactuca sativa*, leaves of *Solanum lycopersicum* plant, and combinations thereof, and wherein the agricultural produce is selected from a group consisting of fruit, vegetable, and combinations thereof.

In an embodiment of the present disclosure, there is provided a method for delaying ripening in an agricultural produce as described herein, wherein the at least one hypoxia-inducing source is nitrogen gas supplied in 2-4 pulses with each pulse of duration in a range of 5-15 minutes. In another embodiment, the at least one hypoxia-inducing source is nitrogen gas supplied in 2-4 pulses with each pulse of duration in a range of 7-12 minutes.

In an embodiment of the present disclosure, there is provided a method for delaying ripening in an agricultural produce as described herein, wherein the at least one hypoxia-inducing source is a solution comprising reduced iron and sodium chloride in a weight ratio range of 5:1 to 12:1. In another embodiment, the solution comprises reduced iron and sodium chloride in a weight ratio range of 7:1 to 11:1.

In yet another embodiment, the solution comprises reduced iron and sodium chloride in a weight ratio of 10:1.

In an embodiment of the present disclosure, there is provided a method for delaying ripening in an agricultural produce as described herein, wherein the nitrite source is selected from a group consisting of potassium nitrite, sodium nitrite, calcium nitrite, and combinations thereof.

In an embodiment of the present disclosure, there is provided a method for delaying ripening in an agricultural produce as described herein, wherein the nitrite source is potassium nitrite having a concentration in a range of 50-700 µM. In another embodiment, potassium nitrite is having a concentration in a range of 100-600 µM. In yet another embodiment, potassium nitrite is having a concentration in a range of 200-550 µM.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The working examples as described below exemplifies the present disclosure with relevant figures. The present section also describes the criticality of the method followed for delaying the ripening of an agricultural produce.

Example 1

Effect of Endogenously Produced Nitric Oxide (NO) on Ripening of Tomatoes

Figure 2:
FIG. 2 illustrates the effect of NO originated from dill leaf in delaying fruit ripening. The left image shows the treatment of tomatoes by hypoxia-induced NO from dill leaves, and the right shows control tomatoes treated with ambient air, in accordance with an embodiment of the present disclosure.
Figure 3:
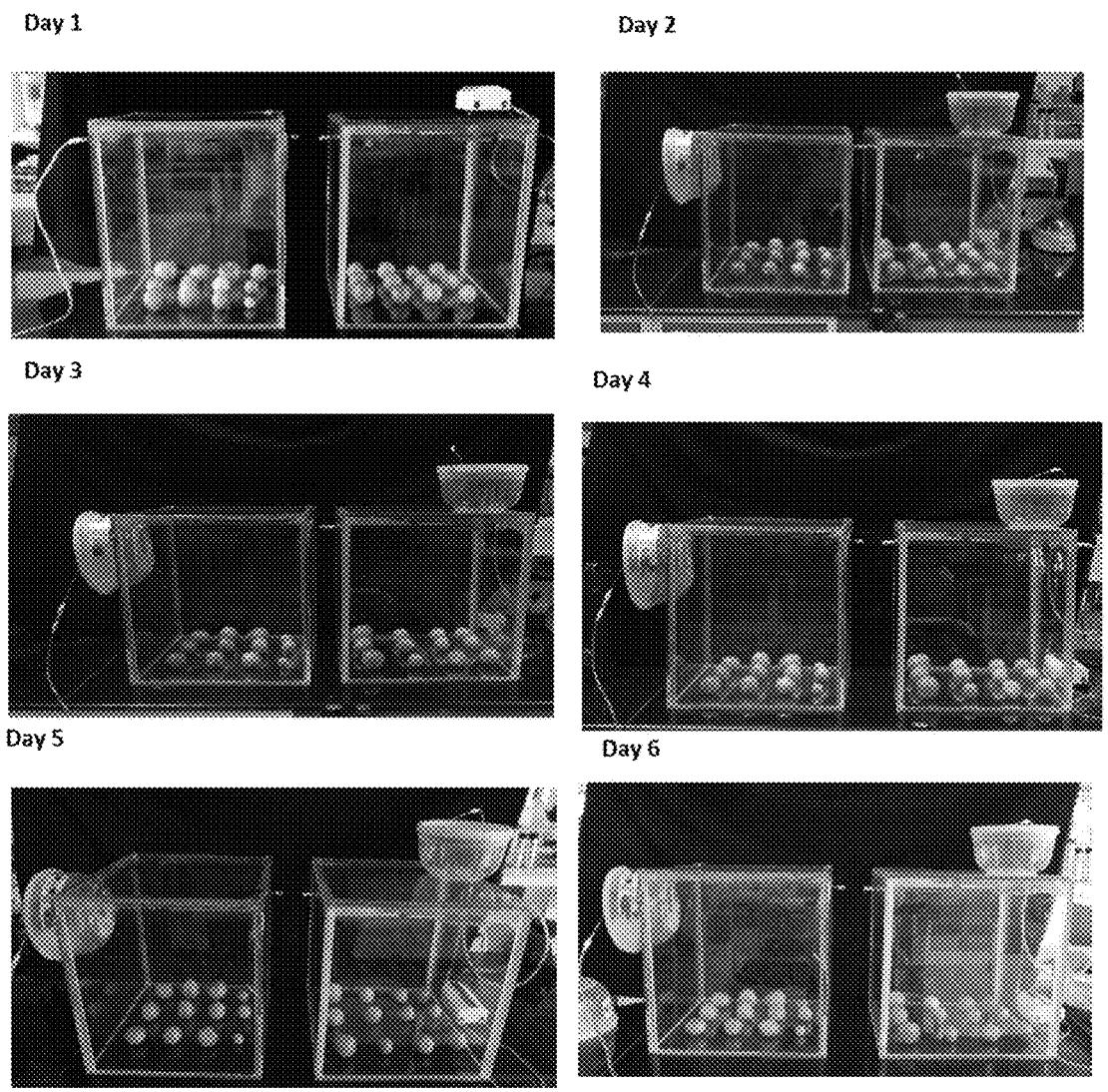
FIG. 3 illustrates the use of curry leaves as hypoxia induced NO source to delay fruit ripening, in accordance with an embodiment of the present disclosure.

Fresh raw tomatoes (*Pusa rubi* and cherry tomatoes) which are matured and are obtained from plants which are about 15 months old were harvested from the field-grown plants located at the campus of NIPGR, New Delhi. The tomatoes were separated into two parts (9 to 12 for each treatment) and were placed in clean polyacrylic boxes. The agricultural produce in the present Example is tomato which is a type of climacteric fruit. These boxes were designed to have separate inlet and outlets and were closed by a lid (FIG. 1A). For induction of nitrite dependent NO production by hypoxia, three different plant materials in form of leaves (matured and fully green leaves) were used i.e. tomato leaves (*Solanum lycopersicum* plant), dill leaves (*Anethum graveolens* plant), and curry leaves (*Murraya koenigii* plant) which were harvested freshly from NIPGR, New Delhi fields. The leaves were washed 3 times with water and 1-2 branches weighing 5 to 10 grams were placed in a fresh solution containing 500 µM potassium nitrite ($KNO_2^-$). Thereafter, the leaves were placed in 10 ml tubes containing potassium nitrite. The tubes along with the leaves were placed in plastic boxes (as shown in FIG. 2A). The experiment was conducted in two sets, with one set acting as the control. One box (control) was connected to the air pump and another box was connected to nitrogen gas (hypoxia-inducing source). The plastic boxes containing the plant material was in-turn connected to the polyacrylic boxes which contained the agricultural produce in form of tomatoes. In the case of control (air treatment), the pump was operated throughout the duration of the experiment. In the case of the nitrogen (experimental setup), two pulses of nitrogen were flushed through the plastic boxes for the duration of 10 minutes for the day (total of 20 minutes of hypoxia treatment). The tomatoes were observed for several days to check the ripening (FIGS. 1-3). It was observed that the ripening of the tomatoes in the experimental setup (with nitrogen) was delayed compared to the control setup (with normal air treatment). The delay in the case of tomatoes exposed to the endogenous NO as described in the present disclosure was for up to 10 days as compared to the tomatoes in the control box.

Example 2

Figure 4:
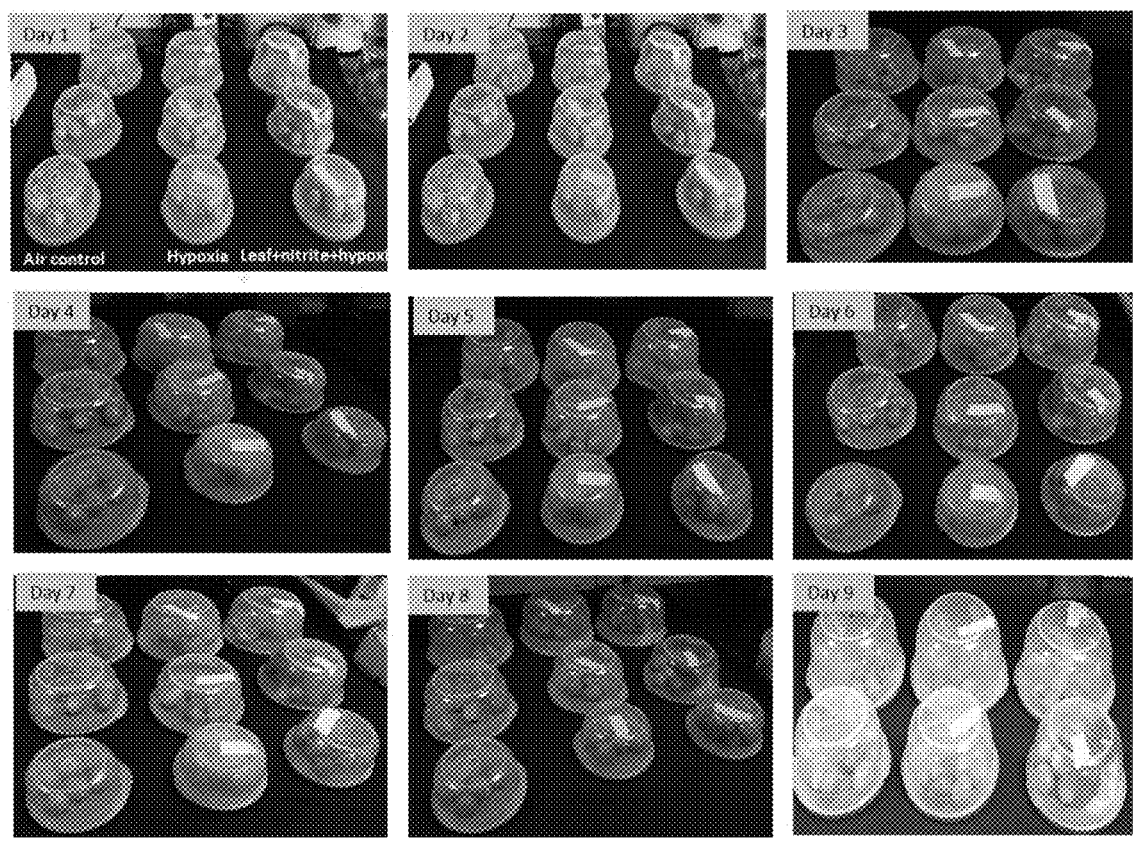
FIG. 4 illustrates the effect of air or hypoxia or hypoxia-induced NO from leaves to delay fruit ripening in small boxes, in accordance with an embodiment of the present disclosure.

Quantification of Endogenously Produced NO as Per the Process of the Present Disclosure The experiment (as provided in Example 1) was repeated in small boxes (FIG. 4) with cherry tomatoes (purchased in local seed store and grown at NIPGR fields). The experimental conditions and the setup were maintained as provided in Example 1. The tomatoes were separated into two parts and were placed either in boxes containing holes (air control), or boxes flushed with two pulses of nitrogen (experimental conditions) for hypoxic conditions. The experimental boxes also contained a small vial of potassium nitrite (nitrite source)+plant material (leaves of *Solanum lycopersicum* plant) and were flushed with nitrogen to create hypoxic conditions. As shown in FIG. 4, tomatoes of the experimental setup (placed with nitrite+leaf+hypoxia) stayed raw and did not ripen at the time when the tomatoes of the control setup were ripened. Further, the setup comprising hypoxia alone caused ripening, suggesting that the observed effect (delayed senescence) was due to the specific combination i.e. nitrite+leaf+hypoxia (FIG. 4).

Figure 5:
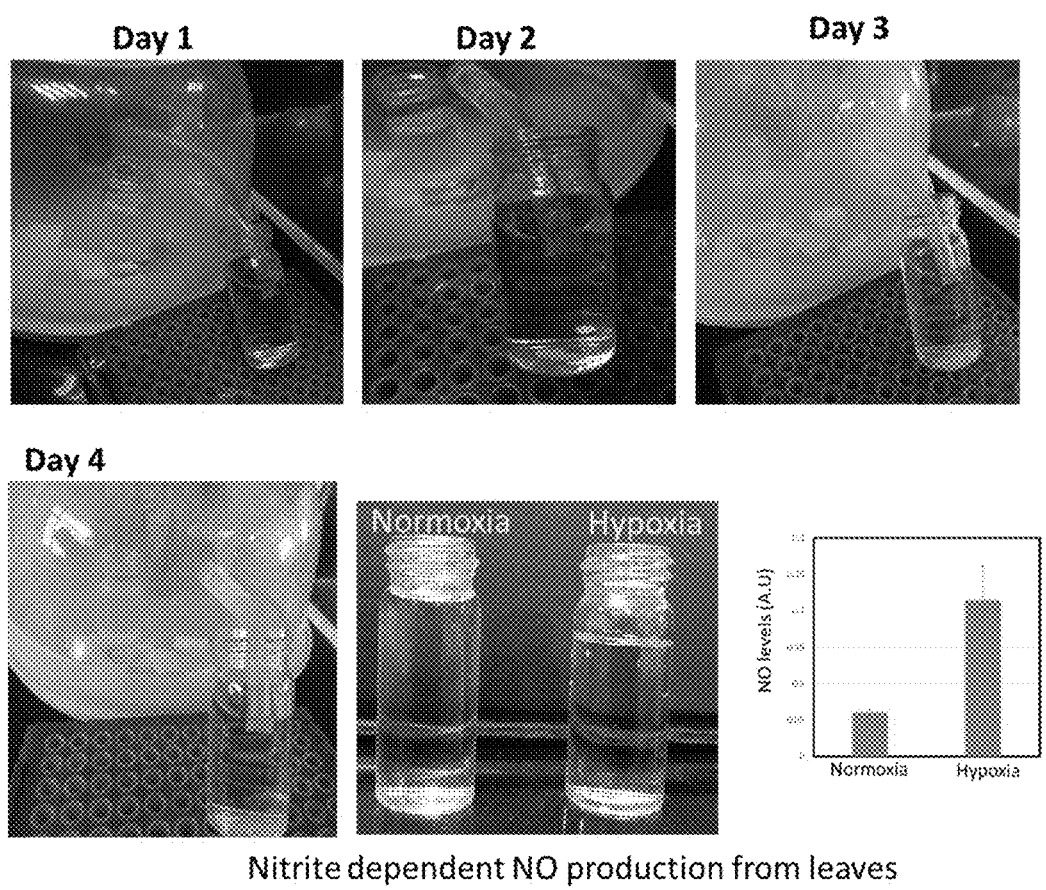
FIG. 5 illustrates the effect of hypoxia on NO production from leaves, in accordance with an embodiment of the present disclosure.

In order to assess the production of NO under nitrite+leaf+hypoxic setup, NO was measured using Griess reagent (FIG. 5). The emitted NO was trapped into a tube containing Griess reagent and checked after fixed time intervals (24, 48 and 72 hours). It was found that the total levels of NO in the tube increase with the passage of time. As a control, the level of NO in the air control setup was also monitored and no change was observed. The NO production in the experimental setup was found to be several times higher in response to the specific nitrite+leaf+hypoxic treatment (FIG. 5). Taken together, the results indicate that nitrite dependent NO under hypoxia delays fruit ripening. Further, it can also be concluded that this delay in the fruit ripening was not merely due to hypoxia (comparative results provided in FIG. 4) but due to the specific combination of plant material in presence of a nitrite source further in presence of at least one hypoxia-inducing source. It can also be seen that the level of NO under hypoxic conditions is significantly higher as compared to that under normal conditions.

Example 3

Effect of the Hypoxia-Inducing Source (Oxygen Quencher) on Ripening on Tomatoes

Figure 6:
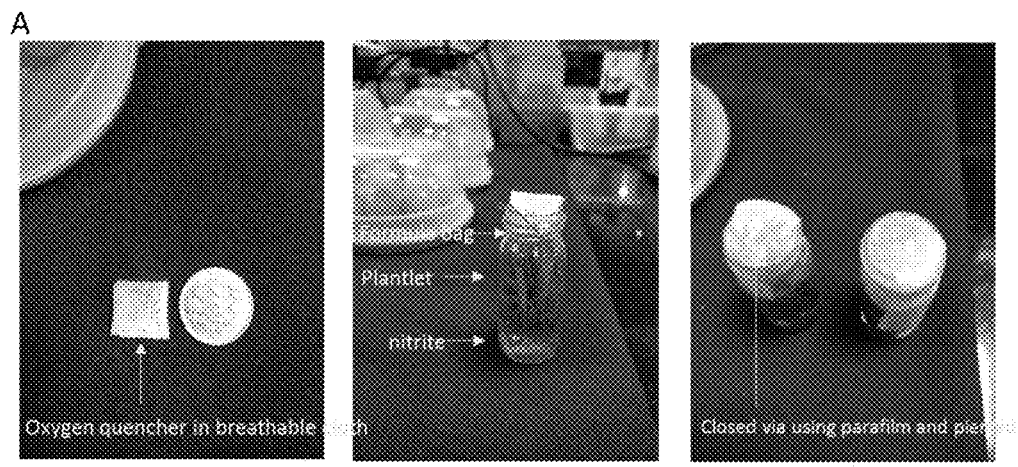
FIG. 6 illustrates the use of an oxygen quenching bag to generate hypoxia to increase NO from leaves, in accordance with an embodiment of the present disclosure.
Figure 6:
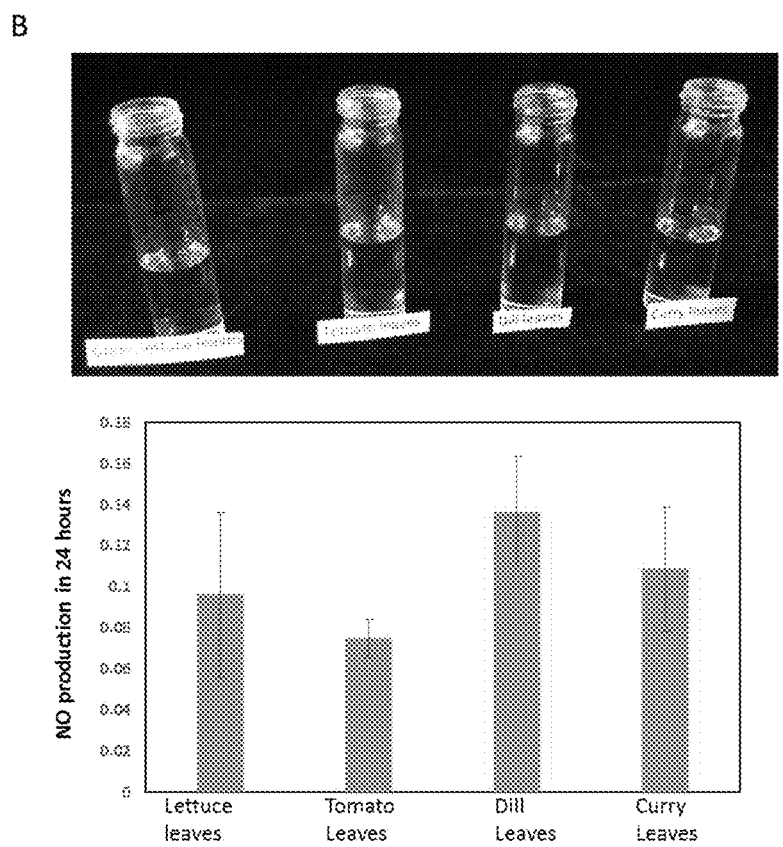
Figure 7:
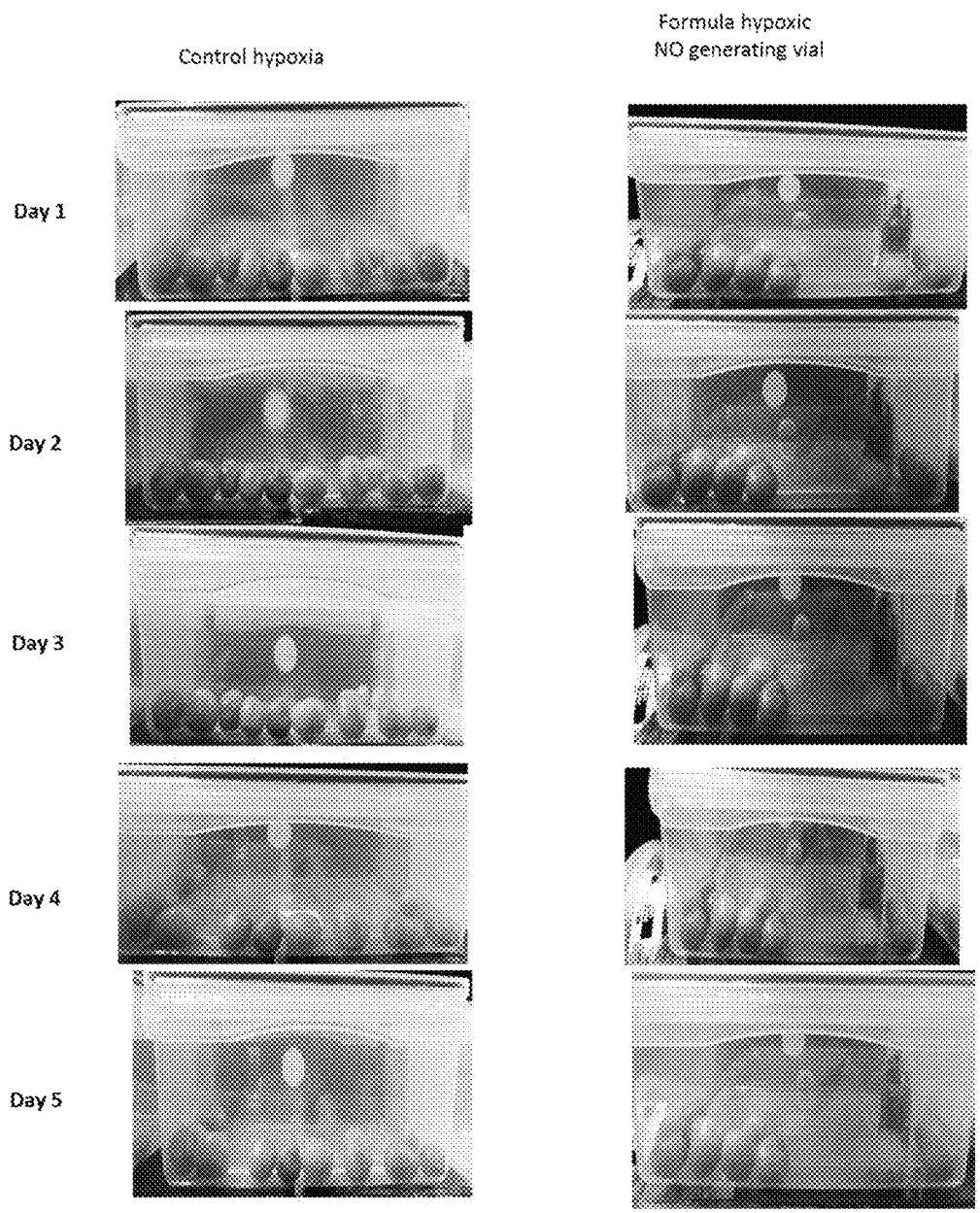
FIG. 7 illustrates the use of an oxygen quenching bag to induce hypoxic NO to enhance shelf-life of fruits, in accordance with an embodiment of the present disclosure.

Based on the results of Examples 1 and 2, the present Example discloses the effect of an oxygen quencher formulation in inducing hypoxia (hypoxia-inducing source). A mixture of reduced iron and sodium chloride (NaCl) (10:1) was used as an oxygen quencher (hypoxia-inducing source). The mixture was placed in a breathable cotton bag and was sealed (FIG. 6A). The sealed bag was then placed inside a small glass bottle that contained NO producing dill leaf (seeds procured from the Indian Agriculture Research Institute store and grown at NIPGR fields) and potassium nitrite and closed with parafilm. The setup was pierced and was kept in an airtight pack that contained tomatoes in order to assess the delay in their ripening (FIG. 7). As a control, a flushed box with hypoxia was also set up. As shown in FIG. 7, a prolonged delay in fruit ripening was observed in the setup comprising the oxygen quencher (nitrite source+plant material in form of leaves+oxygen quencher (hypoxia-inducing source)).

Figure 8:
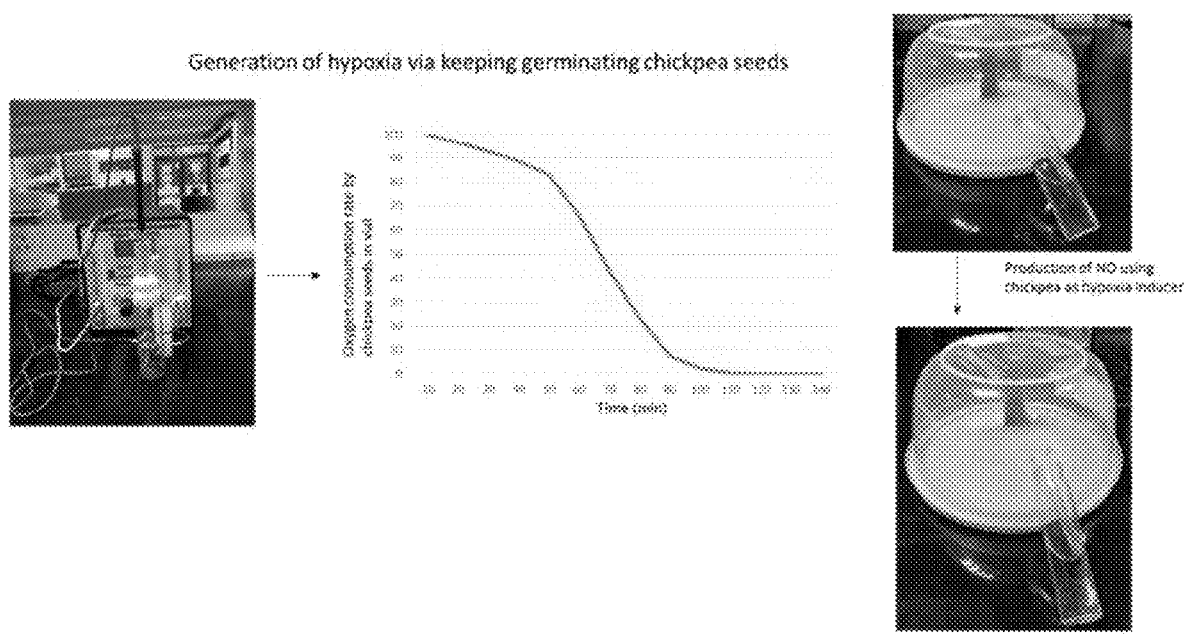
FIG. 8 illustrates the use of germinating chickpea as oxygen quenchers to generate hypoxia-induced NO, in accordance with an embodiment of the present disclosure.
Figure 9:
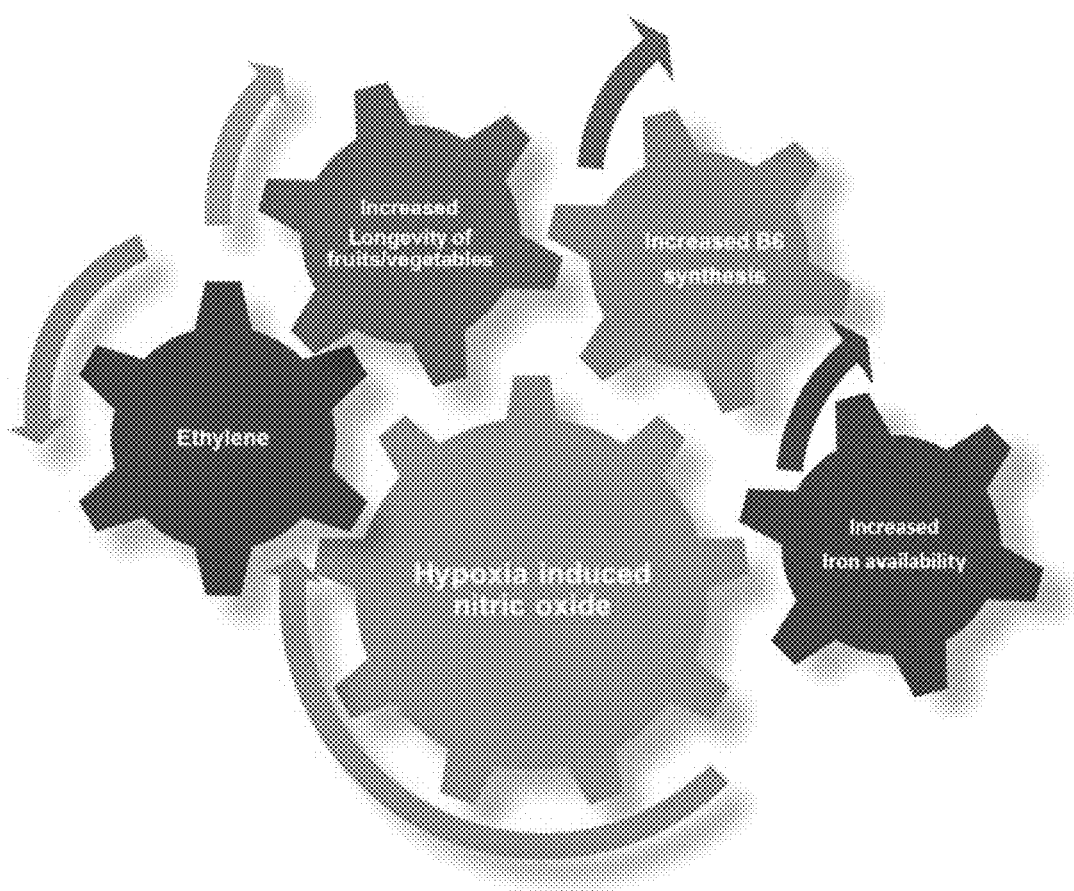
FIG. 9 illustrates a model on the role of hypoxia-induced nitric oxide in downregulating ethylene, increasing longevity of fruits/vegetables and increasing pools of Vitamin B6 and iron, in accordance with an embodiment of the present disclosure.

Important observations of the experiment are as follows: (a) fastest ripening: observed in tomatoes which were treated with ambient air (natural conditions); (b) slow ripening: observed in tomatoes which were connected to the plastic box under only hypoxic condition; and (c) slowest ripening: observed in setup comprising plant material treated with nitrogen gas as the hypoxia-inducing source (FIG. 4) or the oxygen quencher formula as described in the present example as the hypoxia-inducing source i.e. (hypoxia-inducing source+nitrite source+plant material in form of leaves (FIG. 7). FIG. 8 depicts the generation of hypoxia in the presence of germinating chickpea seeds. The experiment as illustrated in FIG. 8 shows the production of NO from dill leaves in presence of germinating chickpea seeds which were used as a hypoxia-inducing source. FIG. 9 depicts a model describing the role of hypoxia-induced nitric oxide in downregulating ethylene, thereby, increasing the longevity of agricultural produce by delaying the ripening and simultaneously increasing the pools of Vitamin B6 and iron.

Example 4

Figure 10:
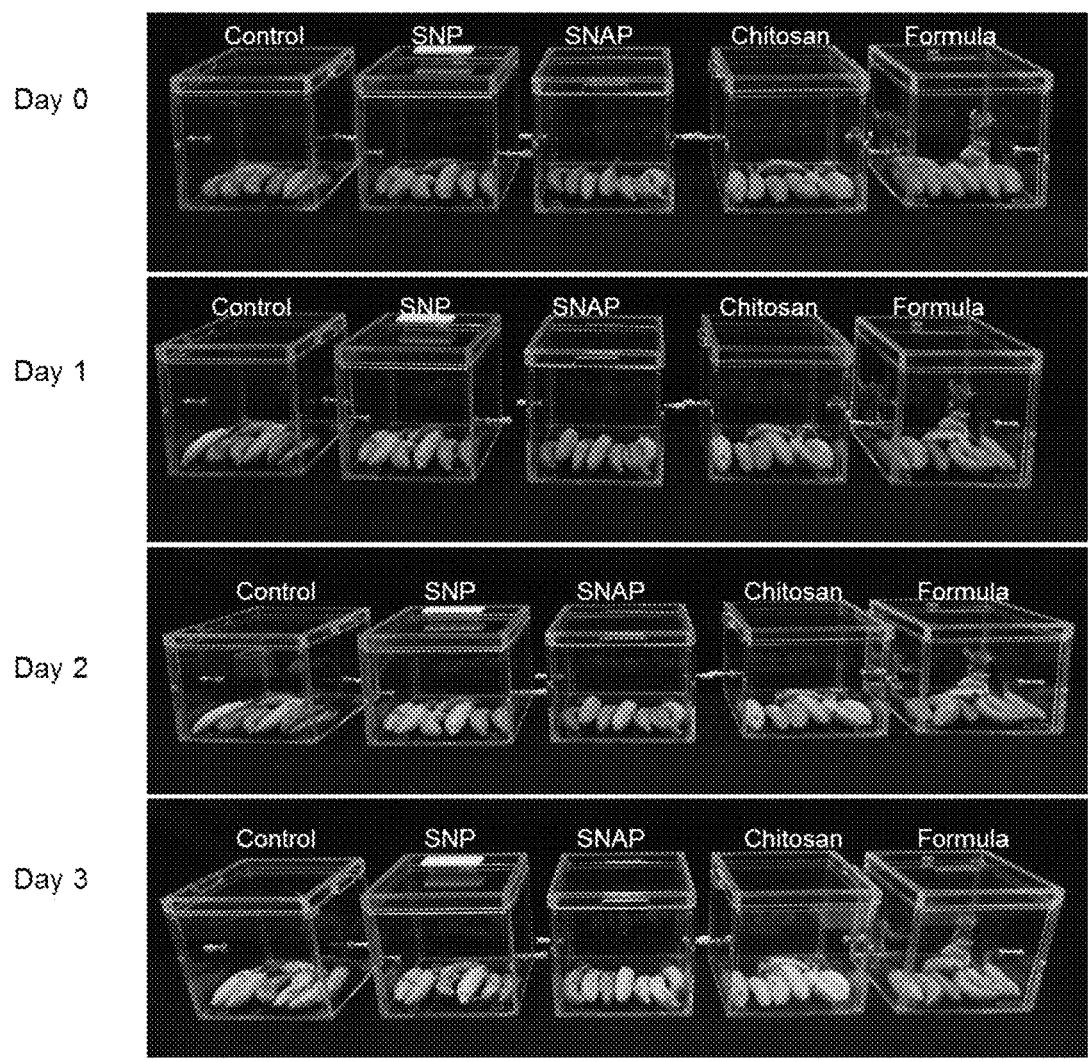
FIG. 10 illustrates the effect of NO donors sodium nitroprusside (SNP), S-nitroso-N-acetyl-dl-penicillamine (SNAP), chitosan, hypoxia-induced NO production in the ripening of banana, in accordance with an embodiment of the present disclosure.

Effects of Using the Process as Described in the Present Disclosure on Banana and a Comparison of Using Other NO Donors Effects of using hypoxia-induced NO on fruit ripening were tested against the available NO donors such as SNP (Sodium nitroprusside), SNAP (S-Nitroso-N-acetyl-dl-penicillamine), chitosan on *Nanjungud rasbale* banana. Physiological concentrations of NO donors were used and the concentration for SNP used was 1 mM, SNAP was used in a concentration of 100 μM, chitosan was used in a concentration of 1%. Out of all the treatments, hypoxia-induced NO yielded better results where a significant delay of ripening was observed (Table-1). SNP and chitosan were effective up to 2 days but later they were ineffective on delaying ripening. Even after 3 days of treatment only one fruit ripened in the presence of formula in comparison to other treatments where 60% of fruits were ripened (FIG. 10). Taken together these results suggest that hypoxia-induced NO production has a superior advantage over other artificial NO donors. It was observed that the delay in ripening of bananas by the method of the present disclosure was 7 days as compared to the bananas which were not treated by the method of the present disclosure.

TABLE 1

Effect of various NO donors and hypoxia-induced NO production on ripening score of banana

| Treatment | Number of fruits ripened | | | |
|---|---|---|---|---|
| | Day 0 | Day 1 | Day 2 | Day 3 |
| Control | 0 | 1 | 2 | 6 |
| SNP | 0 | 1 | 3 | 5 |
| SNAP | 0 | 0 | 2 | 4 |
| Chitosan | 0 | 1 | 3 | 7 |
| Hypoxia-induced NO (process as described in the present disclosure) | 0 | 0 | 0 | 1 |

Example 5

Figure 11:
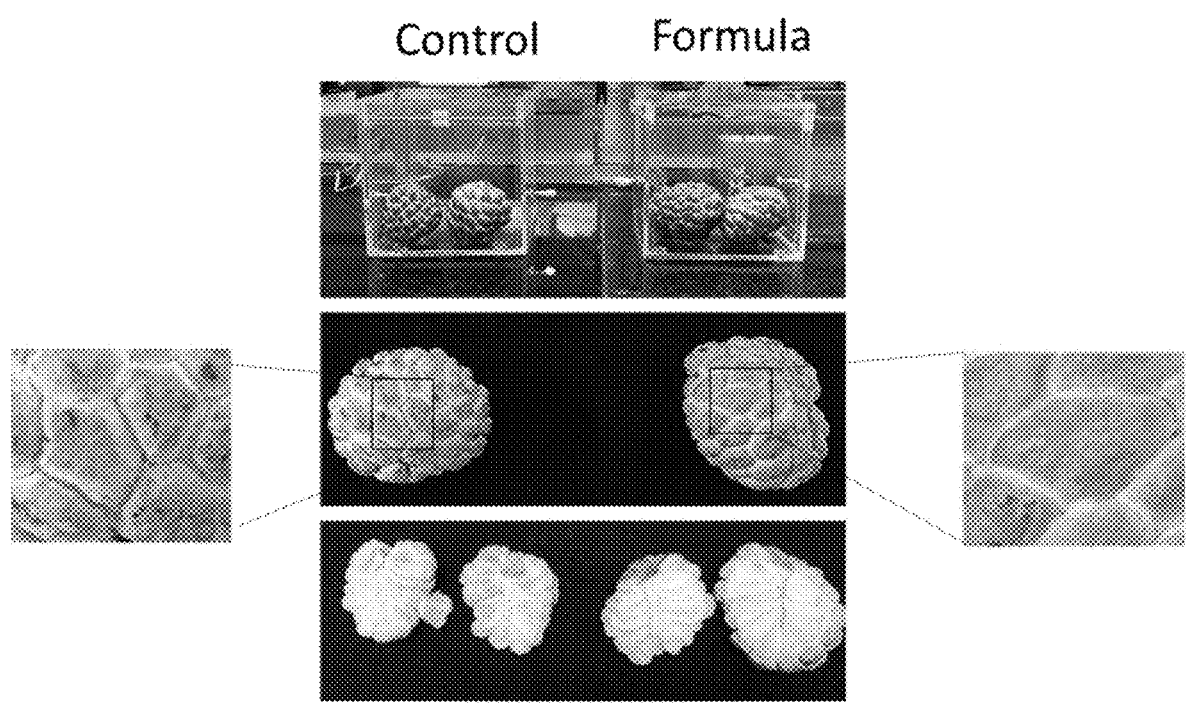
FIG. 11 illustrates the role of hypoxia-induced NO on the delay of fruit ripening in sweet apple, the left image shows control and enlarged image show intactness of the fruit after 2 days of treatment and the right image shows hypoxia-induced NO effect, in accordance with an embodiment of the present disclosure.

Effects of Using the Process as Described in the Present Disclosure on Sweet Apple Effect of hypoxia-induced NO production was also evaluated on a superior variety of sugar apple. Sugar apples were purchased from the local market in New Delhi and are treated with hypoxia-induced NO production as defined in the present application. It was observed that after 2 days the control fruits were fully ripened and lost integrity (shown left in-set image of FIG. 11. The fruits that were treated with hypoxia-induced NO production as defined in the present application were intact and not fully ripened (FIG. 11). It was observed that the delay in ripening of bananas by the method of the present disclosure was 4 days as compared to the bananas which were not treated by the method of the present disclosure.

In conclusion, the present disclosure provides an effective methodology to employ nitrite dependent NO as a potential tool to delay fruit ripening/senescence. Specifically, NO can be generated from fresh leaves using nitrite under hypoxic conditions. This naturally generated NO from leaves can subsequently be used as a potential tool to increase longevity and shelf life of any agricultural produce (fruits and vegetables).

Advantages of the Present Disclosure

The present disclosure discloses a method for delaying the ripening of an agricultural produce by utilizing the endogenously produced NO which is produced by a plant material in the presence of nitrite source and at least one hypoxia-inducing source. The present disclosure avoids the usage of any external chemical for generating NO, thereby circumventing various drawbacks as mentioned in the background section. The method as described in the present disclosure presents numerous advantages which are as follows: (a) leaves release NO only at physiological levels (low level) which does not cause tyrosine nitration; (b) the release of NO at physiological levels (via natural phenomena) also does not cause harm to the operators; (c) the present process allows the user to achieve slow and controlled release of NO, the sustained release of NO also helps in a process called 'nitrosylation', which boosts the natural defense of the plant and provides enhanced protection against pathogens; and (d) since NO is released in a slow and continuous manner, it also increases the longevity of the fruit rawness (delayed senescence) by several folds.

We claim:

1. A method for delaying ripening in an agricultural produce, said method comprises:
   a) contacting a plant material with a nitrite source selected from the group consisting of potassium nitrite, sodium nitrite, calcium nitrite, ammonium nitrite, and combinations thereof, wherein said plant material is selected from the group consisting of leaves of *Murraya koenigii* plant, leaves of *Anethum graveolens* plant, *Lactuca sativa*, leaves of *Solanum lycopersicum* plant, or combinations thereof;
   b) providing at least one hypoxia-inducing source to the plant material to enable endogenous production of nitric oxide in presence of the nitrite source and hypoxic conditions; and
   c) exposing the agricultural produce to the nitric oxide endogenously produced in step (b) for delaying ripening in the agricultural produce, wherein the agricultural produce is selected from the group consisting of fruit, vegetable, and combinations thereof.

2. The method as claimed in claim 1, wherein the at least one hypoxia-inducing source is selected from the group consisting of nitrogen gas, a solution comprising reduced iron and sodium chloride, germinating chickpea seeds, germinating pigeon pea seeds, germinating wheat, germinating mung bean seeds, and combinations thereof.

3. The method as claimed in claim 2, wherein the at least one hypoxia-inducing source is nitrogen gas supplied in 2-4 pulses with each pulse of duration in a range of 5-15 minutes.

4. The method as claimed in claim 2, wherein the at least one hypoxia-inducing source is the solution comprising reduced iron and sodium chloride in a weight ratio range of 5:1 to 12:1.

5. The method as claimed in claim 1, wherein the nitrite source is potassium nitrite having a concentration in a range of 50-700 µM.

6. The method as claimed in claim 1, wherein the agricultural produce is a climacteric fruit.

* * * * *